United States Patent Office 3,198,812
Patented Aug. 3, 1965

3,198,812
WATER SOLUBLE REACTIVE ANTHRAQUINONE DYES
Guenter Krehbiel and Helmut Preugschas, both of Ludwigshafen (Rhine), Germany, assignors to Badische Anilin- & Soda - Fabrik Aktiengesellschaft, Ludwigshafen (Rhine), Germany
No Drawing. Filed Jan. 3, 1962, Ser. No. 164,169
Claims priority, application Germany, Jan. 14, 1961, B 60,848
4 Claims. (Cl. 260—372)

This invention relates to new reactive dyes of the formula

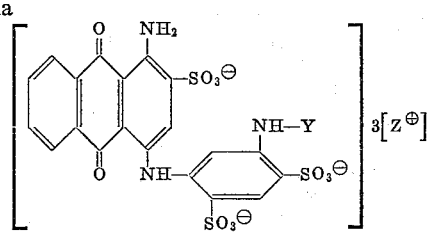

in which $Z^{\oplus}$ denotes a cationic radical and Y denotes one of the radicals —CO—CH$_2$.CH$_2$.Cl, —CO—CH$_2$.CH$_2$.Br, —CO.CH=CH$_2$, $$-CO.\underset{Cl}{C}=CH.COOH \text{ and } -CO.CH=\underset{Cl}{C}.COOH$$

More specifically, it relates to dyes of the formulae

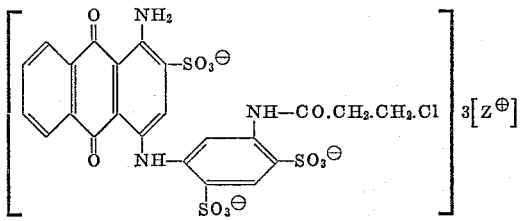

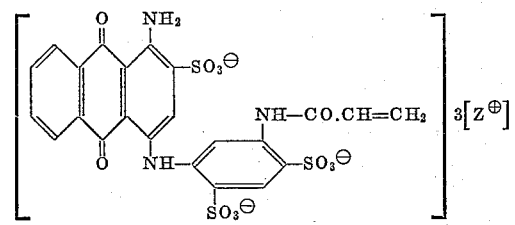

and

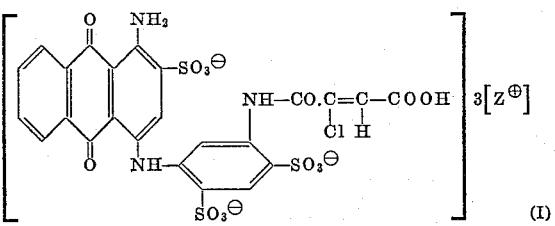

(I)

Reactive dyes, such as are described in the literature, for example in the periodical "Textil-Rundschau" 13 (1958) on pages 323 to 325, in the periodical "Textil-Praxis" 13 (1958) on pages 936 to 940 and 1056 to 1061, and in the periodical "The Textile Manufacturer" 84 (1958) on pages 522 to 526, contain in the simplest case, which may be represented by the formula:

S–F–T–X   (I)

attached to the dye moluecule F:
(1) A solubilizing group S and
(2) A reactive group X attached by way of the carrier T of the reactive group.

A water-soluble reactive dye of the anthraquinone series is thus for example the dye of the formula:

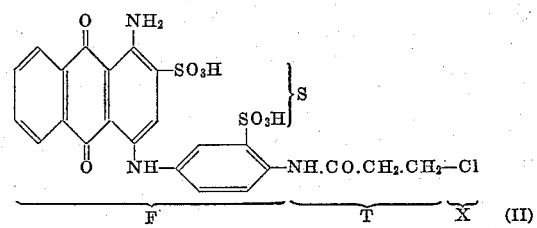

in which the symbols S, F, T and X have the above significance, which is known from British patent specification No. 868,492.

Water-soluble blue to greenish-blue reactive dyes are as a rule obtained by reacting 1-amino-4-bromoanthraquinone-2-sulfonic acid with diaminobenzenes, such as 1,3-diaminobenzene or 1,4-diaminobenzene, or their monosulfonic acids, such as 1,4-diaminobenzene-5-sulfonic acid or 1,3-diaminobenzene-4-sulfonic acid, and converting the resultant compounds of the formulae:

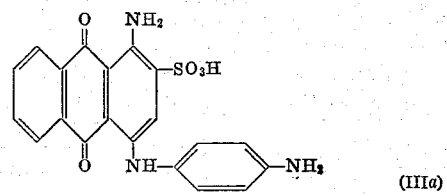
(IIIa)

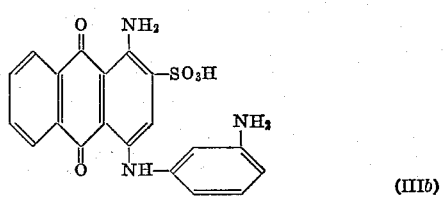
(IIIb)

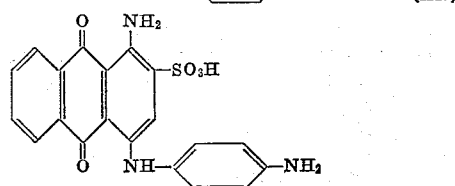
(IIIc)

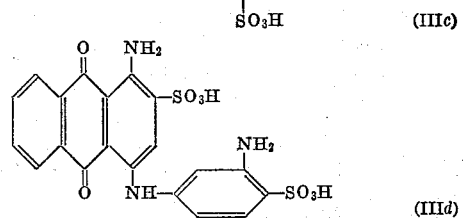
(IIId)

into water-soluble reactive dyes of the anthraquinone series by acylation of the amino group contained on the benzene ring in various ways, for example by conversion with suitable carboxylic acid chlorides or carboxylic acid anhydrides, such as acrylic acid chloride or acrylic acid anhydride, by the process known from German printed application No. 1,089,095.

We have now found that extremely bright reddish-blue new water-soluble reactive dyes of the anthraquinone series are obtained by converting the compounds containing three sulfonic acid groups obtained by introduction of two further sulfonic acid groups into 1-amino-4-(3-aminophenyl)-aminoanthraquinone-2-sulfonic acid of the Formula IIIb above or their salts into reactive dyes by acylating the amino group contained on the benzene ring with acrylic acid chloride, acrylic acid bromide, acrylic acid anhydride, chloromaleic acid anhydride, β-chloropropionic acid chloride or β-bromopropionic acid bromide.

For the introduction of two further sulfonic acid groups into the compound of the Formula IIIb, it is convenient to sulfonate 1-amino - 4 - (3 - aminophenyl)-aminoanthraquinone-2-sulfonic acid or its salts by heating with sulfuric acid, which has a content of about 10 to 50%, advantageously of 20 to 30%, of free sulfur trioxide, to temperatures between 20° and 80° C., advantageously between 30° and 50° C. In general about 300 to 1000, advantageously 400 to 700, parts by weight of sulfuric acid of the said kind is used for each 100 parts by weight of 1-amino-4 - (3 - aminophenyl)-aminoanthraquinone-2-sulfonic acid or its salts, especially its ammonium or alkali metal salts, such as its sodium or potassium salt. Sulfonation is as a rule completed within half to five hours. More prolonged heating is however in general not injurious. The duration of the sulfonation depends on the sulfur trioxide concentration of the sulfuric acid used, on the temperature chosen and on the ratio of the initial materials and can readily be ascertained in each case by preliminary test. To separate the trisulfonic acid thus obtained it is convenient to pour the sulfonation mixture onto ice and/or into water to which water-soluble neutral salts, for example sodium chloride, potassium chloride or advantageously sodium sulfate, have been added to facilitate deposition of the trisulfonic acid. The 1-amino-4-(3-aminophenyl)-aminoanthraquinone trisulfonic acid is as a rule recovered in the form of a salt, such as the trisodium or tripotassium salt. 1-amino-4-(3 - aminophenyl)-aminoanthraquinone trisulfonic acid, on the basis of its empirical composition, probably corresponds in the form of the free trisulfonic acid to the formula:

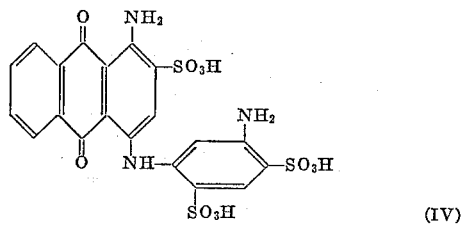

(IV)

The invention accordingly relates to the production of water-soluble reactive dyes of the anthraquinone series of the general formula

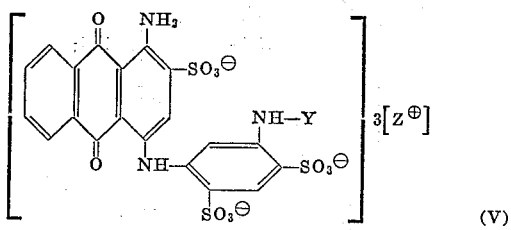

(V)

in whih Y denotes the radical of an acylating agent of the above-mentioned kind and $Z^{\oplus}$ denotes a cationic radical, especially a proton, an ammonium cation or an alkali metal cation, such as a sodium cation or a potassium cation. It is not necessary for each of the three $Z^{\oplus}$ to have the same meaning. One or two of the $Z^{\oplus}$ may be a proton whereas the other one or two $Z^{\oplus}$ may be alkali metal cations.

As radicals Y in formula V above we mention the following radicals of acylating agents:

$-CO-CH_2.CH_2.Br$, $-CO.CH_2.CH_2.Cl$, $CO.CH=CH_2$

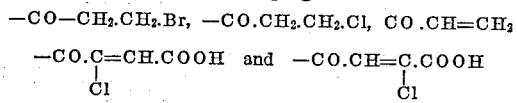

For the production of the new dyes it is usual to start from 1 - amino - 4 - (3 - aminophenyl) - aminoanthraquinone-2-sulfonic acid and to sulfonate this compound by introduction into sulfuric acid which has a content of about 10 to 50%, especially 20 to 30%, of free sulfur trioxide. The dye, separated in the way usual in sulfonations, is then acylated with one of the above-mentioned agents. Acylation may be carried out in various ways, for example in water and in the presence of acid-binding agents, such as alkali metal hydroxides, carbonates, for example of sodium or potassium, and the acylating agent may be added as such or together with a water-soluble solvent or diluent inert under the conditions of the reaction, such as acetone or N,N-dimethylformamide. The intermediate substance of Formula IV to be acylated may however also be dissolved in an agent miscible with water and inert under the conditions of the reaction, for example a carboxylic acid amide, such as N,N-dimethylformamide or N-methylpyrrolidone, and the acylating agent of the above-mentioned kind added. The carboxylic acid amide then acts at the same time as an acid-binding agent. Addition of alkali metal hydroxides, carbonates or hydrogen carbonates to the reaction mixture is therefore not necessary in this case. According to a further embodiment of the process the acylating agent may also be dissolved in a water-soluble solvent inert under the reaction conditions or finely dispersed in water and a concentrated aqueous solution of 1-amino-4-(3-aminophenyl)-aminoanthraquinone trisulfonic acid added. Which of the above-mentioned methods is to be preferred depends in general on the choice of initial material. When working in aqueous liquids, account must be taken of the fact that part of the acylating agent used will react not with the intermediate substance of the Formula IV, but with the water and will thus be lost for the desired reaction. In this case it is therefore necessary to start with an excess of acylating agent. As a rule it is therefore a question of economy whether the use of an organic solvent, such as N,N-dimethylformamide or N-methylpyrrolidone, or the use of an excess of acylating agent is to be preferred.

The dyes obtainable according to this invention are distinguished in their use for dyeing fabrics of cotton or rayon staple according to the padding process in which the reactive dye is padded onto the goods in concentrations of up to 80 grams per liter in the padding liquor and the dye is then fixed by steaming or by the action of hot air, by the fact that they do not precipitate from the padding liquor at temperatures between 20° and 90° C. even in the presence of neutral salts, for example of about 5 to 50 grams per liter of sodium sulfate.

In printing, the excellent water-solubility of the new reactive dyes is of extremely great technical importance because any part of the dye which has not been fixed on the goods to be printed in a manner fast to rubbing can be readily and completely removed by washing after steaming.

By the usual process for dyeing and/or printing textile goods, such as fibers, threads, flock, woven fabrics and knitted fabrics of native and/or regenerated cellulose, bright reddish-blue dyeings or prints of excellent fastness properties are obtained with the new dyes. For example the dye obtainable according to this invention by acylation of the above-described 1-amino-4-(3-aminophenyl)-aminoanthraquinone trisulfonic acid with acrylic acid chloride and which, in the form of the free acid, on the basis of its empirical composition probably has the formula:

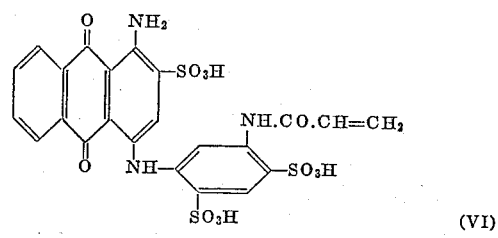

(VI)

yields on cotton clearer and redder blue dyeings than the dye known from German printed application No. 1,089,095 and having the formula:

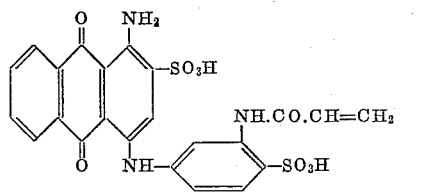

(VII)

The new process permits the production of water-soluble reactive dyes derived from 1-amino-4-(3-aminophenyl)-aminoanthraquinone-2-sulfonic acid, which are capable of dyeing and/or printing cellulosic textile goods in reddish-blue, extremely fast shades. The new dyes are of special technical interest, especially because hitherto the blue water-soluble reactive dyes most important technically have as a rule been derivatives of 1-amino-4-(3-aminophenyl)-aminoanthraquinone-2-sulfonic acid.

The dyes obtainable according to this invention may also be used for dyeing and/or printing material of a great variety of kinds, for example sheets of regenerated cellulose, films of polyvinyl alcohol, or textile materials of natural or synthetic linear polyamides, such as natural silk, wool, polycaprolactam or based on adipic acid and hexamethylene diamine, and are also suitable for dyeing fibrous material such as leather and paper.

The invention is illustrated by, but not limited to, the following examples. The parts and percentages given in the examples are weight units.

EXAMPLE 1

20 parts of 1-amino-4-(3-aminophenyl)-aminoanthraquinone-2-sulfonic acid is introduced while stirring at 0° to +5° C. into 100 parts of sulfuric acid which contains 24% of free sulfur trioxide. The mixture is then heated within one hour to about 40° C., kept for two hours at this temperature and then the reaction mixture is stirred slowly into 100 parts of sodium chloride solution saturated at 20° C. The temperature of the mixture is prevented from rising above 50° to 60° C. by adding 100 parts of ice. The resultant suspension of the reaction product is stirred until it has cooled to room temperature, i.e. about 15° to 25° C., filtered by suction and the filter residue washed with 10% aqueous sodium chloride solution. After drying at 60° C. under reduced pressure, 25 parts of a chromatographically unitary compound containing three sulfonic acid groups is obtained.

Analysis of the product converted into the tripotassium salt gives the following result.

*Analysis.*—Calculated for $C_{20}H_{12}O_{11}N_3S_3K_3$ (683.8): 14.1% of S. Found: 13.9% of S.

6 parts of acrylic acid chloride is introduced in small portions while stirring into a solution of 20 parts of the compound obtained as explained in the first paragraph of this example in 40 parts of N-methylpyrrolidone. The temperature rises to about 40° C. The reaction solution is then stirred into 200 parts of an aqueous potassium chloride solution saturated at about 20° C. The deposited reaction product is then filtered off by suction, washed with saturated aqueous potassium chloride solution and dried at 60° C. 20 parts of dye is obtained in the form of a blue powder. The new dye dyes cotton fabric bright reddish-blue shades by the padding process.

EXAMPLE 2

30 parts of sodium hydrogen carbonate is introduced into an aqueous solution of 20 parts of the compound obtainable according to Example 1, paragraph 1, which has been neutralized with aqueous caustic soda solution. 20 parts of β-chloropropionyl chloride is stirred into the mixture within an hour with good cooling. The temperature should be between 0° and +5° C. Then 5 parts of sodium chloride is introduced into the reaction mixture, the deposited dye is filtered off by suction and washed with 10 parts of methanol. 19 parts of the new dye is obtained. It dyes cotton in the same shade as the dye described in the last paragraph of Example 1.

The new dye bearing a β-chloropropionylamino group can be converted into the dye containing an acrylic acid amide group described in Example 1, paragraph 3, by stirring it in water with alkaline agents, for example for about 1 to 4 hours in about 1 to 8% aqueous caustic soda solution at 15° to 25° C.

If the equivalent amounts of the acylating agents specified in the following table are used instead of β-chloropropionyl chloride, dyes are obtained which on the basis of their empirical composition probably have in the form of their free acids the formulae given in the table. The new dyes dye textile goods of cotton or rayon staple reddish-blue shades.

*Table*

| Example | Acylating agent | Dye |
|---|---|---|
| 3 | Br—CO—CH₂—CH₂Br | anthraquinone dye with NHC(O)—CH₂—CH₂Br group |
| 4 | Cl—C—C=O with CH—C=O (maleic/chloromaleic anhydride) | anthraquinone dye with NHC(O)—C(Cl)=CH—COOH group |

We claim:
1. Dyes of the formula:

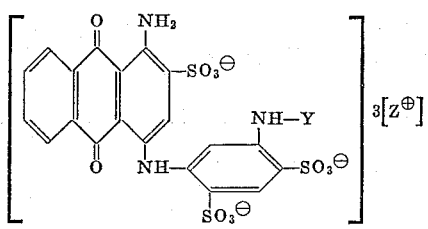

in which $Z^\oplus$ denotes a cationic radical selected from the group consisting of protons and alkali metal cations and Y denotes a member selected from the group consisting of

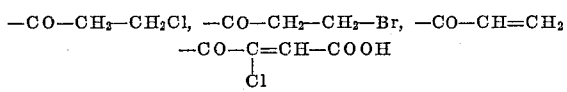

and

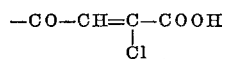

2. The dye of the formula:

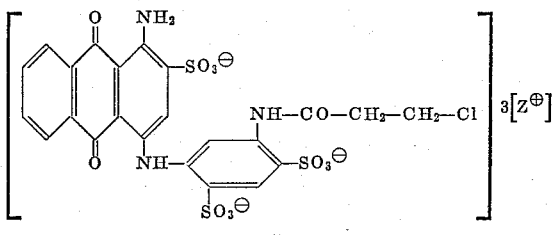

in which $Z^\oplus$ denotes a cationic radical selected from the group consisting of protons and alkali metal cations.

3. The dye of the formula:

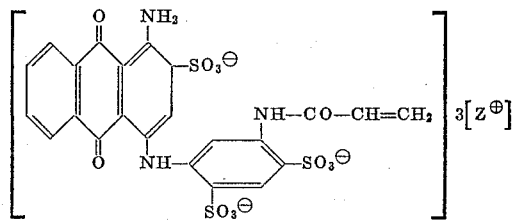

in which $Z^\oplus$ denotes a cationic radical selected from the group consisting of protons and alkali metal cations.

4. The dye of the formula:

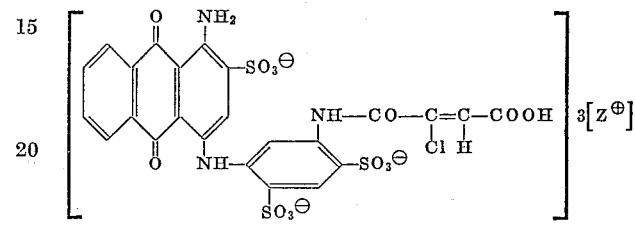

in which $Z^\oplus$ denotes a cationic radical selected from the group consisting of protons and alkali metal cations.

References Cited by the Examiner
UNITED STATES PATENTS

| 2,121,928 | 6/38 | Peter | 260—374 |
| 2,952,690 | 9/60 | Riat | 260—372 |

FOREIGN PATENTS

| 830,876 | 3/60 | Great Britain. |
| 229,235 | 7/60 | Australia. |

References Cited by the Applicant

Article by Wegmann in "Textile Praxis," October 1958, pages 1056–1059.

LORRAINE A. WEINBERGER, *Primary Examiner.*

CHARLES B. PARKER, LEON ZITVER, *Examiners.*